Jan. 24, 1928. 1,657,154
E. L. DELANO ET AL
STORAGE MAGAZINE FOR MOTION PICTURE APPARATUS
Filed Aug. 26, 1926 4 Sheets-Sheet 1
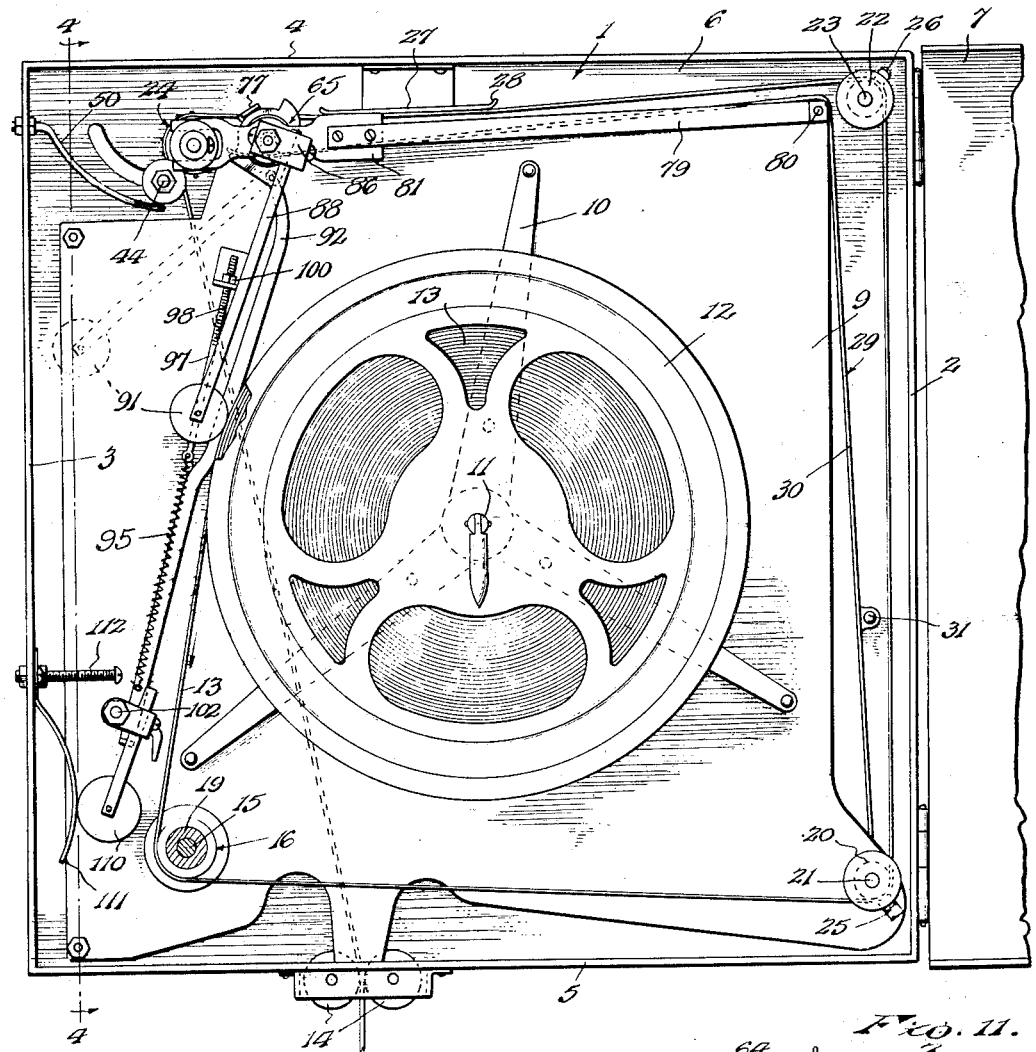
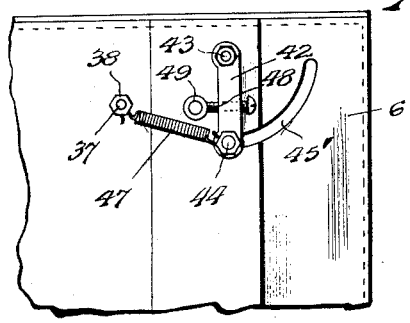
Inventors
E. L. Delano.
G. L. Furlong.
By Lacey & Lacey, Attorney.

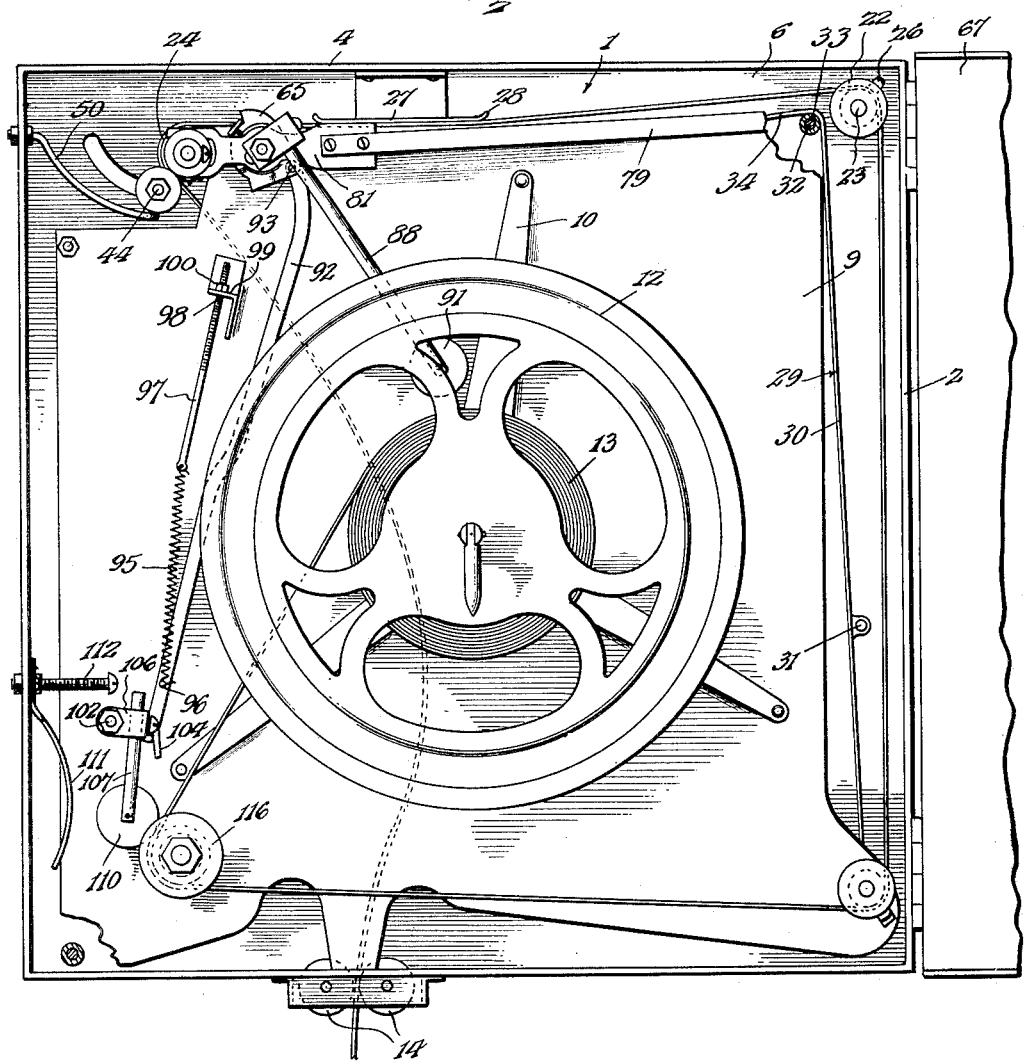

Jan. 24, 1928. 1,657,154
E. L. DELANO ET AL
STORAGE MAGAZINE FOR MOTION PICTURE APPARATUS
Filed Aug. 26, 1926   4 Sheets-Sheet 3

Inventors
E. L. Delano.
G. L. Furlong.

By Lacey & Lacey, Attorneys

Jan. 24, 1928.　　　　　　　　　　　　　　　　1,657,154
E. L. DELANO ET AL
STORAGE MAGAZINE FOR MOTION PICTURE APPARATUS
Filed Aug. 26, 1926　　　4 Sheets-Sheet 4
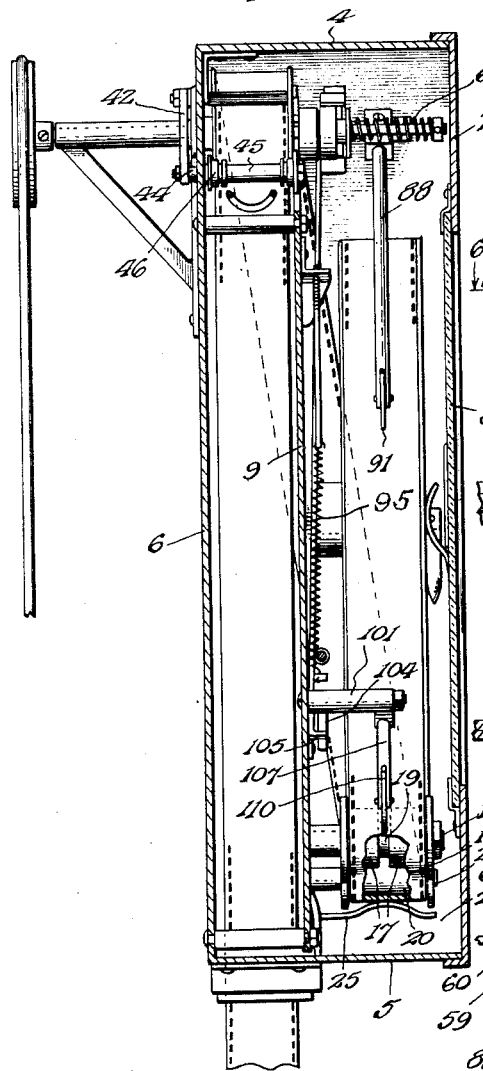
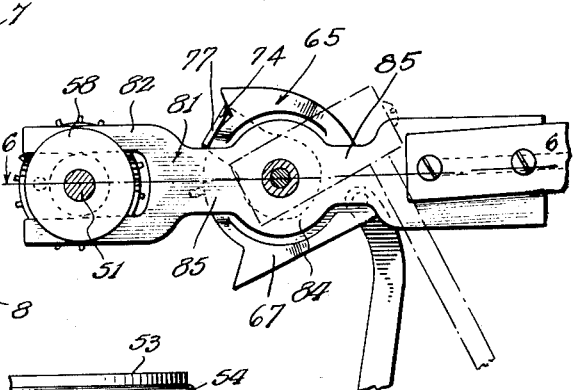
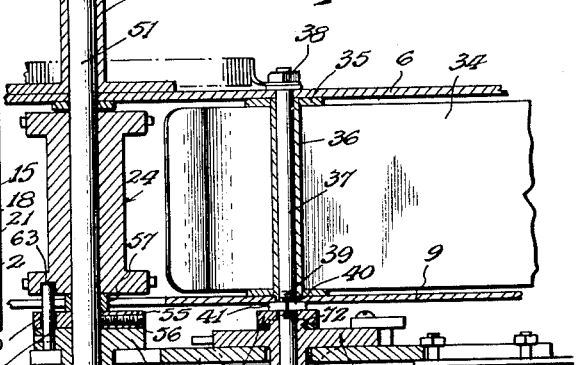
Inventors
E. L. Delano.
G. L. Furlong.
By
Lacey & Lacey, Attorneys Patented Jan. 24, 1928.

1,657,154

UNITED STATES PATENT OFFICE.

EARL L. DELANO AND GEORGE L. FURLONG, OF AGRA, KANSAS.

STORAGE MAGAZINE FOR MOTION-PICTURE APPARATUS.

Application filed August 26, 1926. Serial No. 131,702.

This invention relates to improvements in the film storage and feeding mechanism of motion picture projection apparatus.

Where two or more reels of film are to be successively projected, as for example in the exhibition of a play of such magnitude as to necessitate the employment of more than one reel of film, the exhibition must be interrupted after the first reel of film has been projected, in order to afford the operator of the projection apparatus the opportunity to place the second reel in the feed magazine and thread the same through the motion head of the apparatus, or two projecting machines must be employed. The first method of procedure involves a loss of time and is annoying to the audience and the second method of procedure is expensive. Therefore, the present invention has as its primary object to provide a film storage and feeding means so constructed and operating in such a manner that any desired number of reels of film may be fed to the motion head of the projection apparatus without any interruption whatsoever in the exhibition of the pictures, thus obviating interruption of the exhibition and likewise obviating the employment of a second projection apparatus.

Another object of the invention is to provide film storage and feeding mechanism so constructed that, prior to the time when it would, under the old practice, be necessary to mount and thread the second reel of film to be projected, the end of the reel of film being projected at the time will be presented in a position where it may be conveniently spliced to the end of the second reel of film and the said reel mounted in place of the empty reel. Thus, the invention contemplates the provision of means whereby a full reel of film may be substituted for a reel that has been projected, while the projection of the pictures continues without interruption.

In ordinary practice, the film magazine of a motion picture projection apparatus comprises merely a fire-proof casing in which the film reel is arranged for free rotation and through the bottom of which casing the film is led from the reel to the film feeding mechanism of the motion head of the projection apparatus, the film being drawn from the reel by the rotation of the upper steady sprocket of the said film feeding mechanism of the motion head. Therefore, when the trailing end of film leaves the reel, this end is immediately fed through the film gate and the projection of the pictures ceases, and it is at this point that the second projecting machine, if one is employed, must be brought into action in order to provide for continuity of projection, or the screen must be left darkened until the operator has had opportunity to arrange a full reel in the magazine and thread the same through the film feeding mechanism of the motion head. As distinguished from this old procedure, the invention contemplates the provision of means for rapidly unwinding the final portion of the film from the reel, as for example, one-fourth the length of the film and storing the same so that it may be continued to be fed from the magazine and likewise contemplates the provision of means for finally depositing the end of the film where it will be accessible to the operator of the apparatus who may then remove the empty reel, place a full reel in position, and splice the end of the film thereon to the deposited end of the unwound film, while the surplus length thereof, which has been stored as stated, is being projected, and thus providing for an uninterrupted successive projection of any number of reels of film.

Another object of the invention is to provide a mechanism for accomplishing the result just mentioned, which mechanism will be entirely automatic in its operation, so that the operator is not required to continuously observe the amount of film on the reel but is only required to attend to the replacement of the emptied reel by a full one and splice the ends of the two films.

Another object of the invention is to provide film storage and feeding means operating in the manner stated and capable of installation in connection with any motion picture projection apparatus regardless of the character of the film feeding mechanism of the motion head thereof.

In the accompanying drawings:

Figure 1 is a view in side elevation of the mechanism embodying the invention, the parts being in the positions which they will assume when the film reel is substantially full.

Figure 2 is a similar view illustrating the positions of the parts when a predetermined length of the film has been unwound from the reel.

Figure 4 is a vertical transverse sectional view taken substantially on the line 4—4 of Figure 1, looking in direction indicated by the arrows.

Figure 5 is a detail view in side elevation, of a portion of the mechanism.

Figure 6 is a horizontal sectional view taken substantially on the line 6—6 of Figure 5, looking in the direction indicated by the arrows, the film unwinding sprocket of the mechanism being illustrated as clutched for rotation with the shaft with which it is associated and whereby to unwind the film from the reel.

Figure 7 is a similar view illustrating the parts shown in Figure 6, in the positions which they will assume with the film unwinding sprocket idle.

Figure 8 is a group perspective view illustrating certain members of the automatic clutch operating means of the mechanism.

Figure 10 is a fragmentary side elevation of a portion of the mechanism.

Figure 11 is an end elevation of the film unwinding sprocket.

Figure 3:
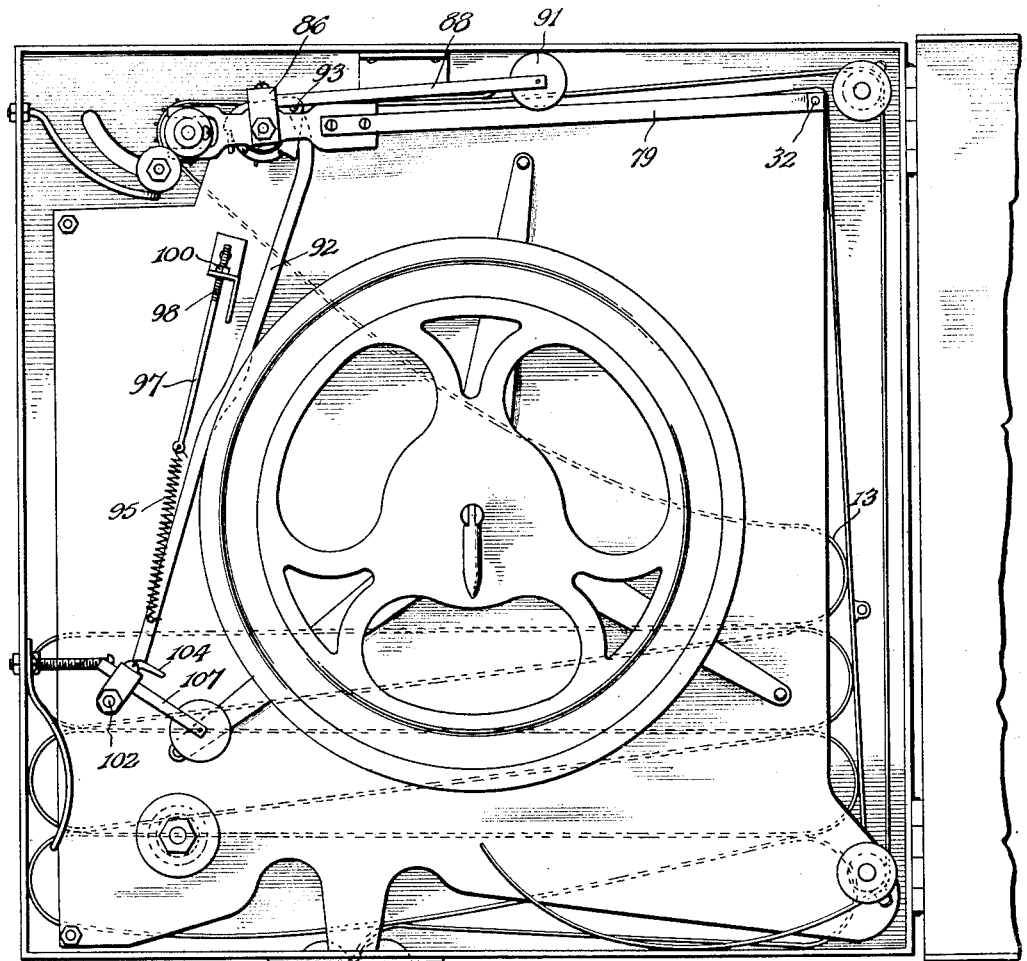
Figure 3 is a similar view illustrating the positions of the parts when the film has been completely unwound from the reel.

The mechanism embodying the invention is housed within a casing indicated in general by the numeral 1 and comprising front and rear walls 2 and 3, top and bottom walls 4 and 5, a side wall 6, and a hinged door 7 closing the other side of the casing, a pane of glass 8 being mounted in an opening in the door so that the operator may view the film reel which is mounted within the casing. The numeral 9 indicates a partition wall which is mounted upon the side wall 6 of the casing in spaced relation thereto, as clearly shown in Figure 4 of the drawings. The casing and the partition wall are of metal and the partition wall preferably has the marginal contour shown most clearly in Figures 1, 2 and 3 of the drawings, and is supported a sufficient distance spaced from the wall 6 of the casing to permit of the passage of a length of film between the partition wall and the said wall 6 of the casing under conditions and in a manner to be presently explained. A spider 10 is secured upon that side of the partition wall 9 which is presented to the open side of the casing, and a stub shaft 11 is carried by the spider and constitutes a means for rotatably supporting the film reel which is indicated by the numeral 12, the film upon the reel being indicated by the numeral 13. In its bottom 5, the casing is formed with an opening and the usual guide rollers 14 are mounted in juxtaposition to this opening to guide the stretch of film as it passes from the casing to the upper steady sprocket of the film feeding mechanism of the motion head of the projecting apparatus.

The numeral 15 indicates a stub shaft which is mounted upon the partition wall 9 and projects laterally therefrom in the direction of the open side of the casing, and rotatably mounted upon this shaft is a film pulley indicated by the numeral 16, the said pulley comprising two counterpart sections 17 having heads 18 at their relatively remote ends to confine the film to the bodies of the sections, a collar 19 being fitted onto the shaft 15 between the relatively adjacent ends of the sections of the pulley and thus spacing the said ends to provide, in effect, a peripheral groove extending circumferentially about the pulley as a whole midway between the ends thereof. The purpose of this construction will presently be made clear. From the reel 12, the film 13 is led downwardly and about the pulley 16 and thence forwardly and about a pulley 20 which is rotatably mounted upon a shaft 21 at the lower forward corner of the partition wall 9. At its front, the partition wall is spaced from the front wall 2 of the casing, and the film is led upwardly from the pulley 20 to and about a pulley 22 rotatably mounted upon a shaft 23 in turn mounted upon the side walls 6 of the casing and projecting laterally therefrom. By reference to Figure 4 of the drawings, it will be observed that the stretch of the film which passes between the pulleys 20 and 22 extends upwardly at an angle of inclination toward the side wall 6, so that the stretch of the film which passes from the pulley 22 and rearwardly to and about the unwinding film sprocket, which is indicated in general by the numeral 24, travels between the wall 6 and the upper portion of the partition wall 9, whereas the stretch of the film which leads from the reel 12 and about the guide pulleys 16 and 20, travels at the opposite side of the partition wall. From the film sprocket 24, the film is led downwardly between the wall 6 of the casing and the partition wall 9 and between the rollers 14 and to the film feeding mechanism of the motion head of the projecting apparatus. A guard 25 is preferably associated with the film guiding pulley 20 and a similar guard 26 is associated with the pulley 22, and the stretch of the film which leads from the pulley 22 to the unwinding sprocket 24, preferably is passed beneath a guide 27 mounted upon the wall 6 of the casing, the guide comprising a plate having its ends upturned, as at 28, so as to prevent injury to the film. The numeral 29 indicates a strip of sheet metal which constitutes a guard and which comprises a portion 30 riveted or otherwise secured at 31 to the side wall 6 of the casing and extending from a point above the pulley shaft 21 to a bolt 32 which is secured at its ends in the side wall 6 and in the upper forward corner of the partition wall 9. A spacing sleeve 33 is fitted upon the bolt 32 between the wall 6 and partition wall 9, and the guard strip 29 is formed with a bend engaging over the said sleeve and providing a rearwardly and slightly downwardly inclined portion 34 which extends between the said walls 6 and 9 and is provided near its rear end with apertured ears 35 which engage the ends of a spacing sleeve 36 upon a shaft 37 which is fitted at one end through an opening in the wall 6 and has a nut 38 threaded thereon to bear against the outer side of the wall, the shaft between its ends having a threaded portion 39 extending through an opening 40 in the partition wall 9, and a nut 41 being threaded onto this portion and bearing against the said wall 9, as shown in Figure 6 of the drawings. As will be observed by reference to this figure, the end of the portion 34 of the guard strip terminates relatively close to the film sprocket 24 and it will be understood that as the film is led from the guide pulley 22, it will be supported upon the portion 34 of the guard strip and pass between the same and the guide 27 and thence to the film sprocket 24. An arm 42 is pivotally mounted as at 43 upon the outer side of the wall 6 of the casing and a shaft 44 is secured at one end in the free end of this arm and works in an arcuate slot 45′ formed in the casing wall 6 concentric to the pivot 43 for the arm. A roller 45 is freely rotatably mounted upon the said shaft 44 within the casing and is provided at its ends with peripherally grooved heads 46, the grooves in the peripheries of the heads accommodating the teeth of the film sprocket 24 and the said roller being held against the portion of the film which passes about the said sprocket, through the medium of a coiled spring 47 which is connected at one end to the said secured end of the shaft 44 and at its other end to the shaft 37 through the medium of the nut 38. The degree of pressure of the roller against the film is limited by the engagement of the end of an abutment screw 48, which screw is threaded through the arm 42, with a stop pin 49 upon the wall 6 of the casing. Inasmuch as the mounted end of the shaft 44 rides in the slot 45′, the arm 42 may be swung so as to move the presser roller 45 away from the film sprocket 24 at the time the film is being threaded through the mechanism and over the said sprocket. Mounted within the casing upon the rear wall 3 thereof is a guard 50 which is curved downwardly and forwardly with its free end terminating beneath the presser roller 45 in the active position of the said roller and this guard serves to prevent bunching or piling up of the film in this corner of the casing when rotary motion is imparted to the film sprocket 24 under conditions to be presently explained.

The film sprocket 24 is mounted for free rotation upon a shaft 51 journaled in a bearing 52 upon the wall 6 of the casing, and a pulley 53 is fixed upon the outer end of the shaft and is adapted to be driven from a motor through the medium of a belt 54. A collar 55 is fixed upon the shaft 51 by a set screw 56, and a spacing collar 57 is loosely mounted upon the shaft between the collar 55 and the adjacent end of the film sprocket 24. The numeral 58 indicates a collar which is slidably mounted upon the shaft beside the collar 55, and a pin 59 is carried by the collar 58 and projects laterally from that face thereof which opposes the collar 55 and through an opening 60 formed in the said collar 55. A spring 61 is mounted upon the shaft outwardly of the collar 58 and bears at one end against the said collar and at its other end against a collar 62 fixed upon the shaft, the spring yieldably holding the collar 58 against the collar 55 with the pin 59 projected through the opening 60 and beyond the said collar 55 in the direction of the adjacent end of the film sprocket 24. The film sprocket is formed in its said end with a socket 63 and with a groove 64 concentric to its axis and communicating at one end with the outer end of the socket and being gradually decreased in depth in the direction of its other end where it merges with the face of the film sprocket at said end thereof. By reference now to Figures 6 and 7 of the drawings, it will be observed that when the collar 58 is resting against the collar 55, the end of the pin 59 will project into the socket 63, thus connecting the film sprocket for rotation with the shaft 51, as shown in Figure 6, and it will likewise be observed that when the collar 58 is slid upon the shaft away from the collar 55 and against the tension of the spring 61, the end of the pin will be retracted from the socket, thus permitting the shaft to continue its rotary movement without rotating the film sprocket. It will likewise be evident that the bottom wall of the groove 64 constitutes a surface against which the end of the pin rides as it is carried about by the collar 55 so that it is guided with certainty to position within the socket 63.

The numeral 65 indicates in general a cam which has a sleeve 66 extending from one face thereof and rotatably fitting upon the shaft 37. The cam 65 comprises a body provided upon one face with raised cam portions 67 and 68, the portions being substantially diametrically oppositely located, and their adjacent portions merging with the said face of the cam body so that the body between the cam portions is substantially flat-sided. For a purpose to be presently explained, one of the cam portions, at the periphery of the cam body, presents a shoulder 69, and a stud 70 projects from the periphery of the cam body in spaced relation to the said shoulder, the peripheral portion of the body between the shoulder and the stud being concentric to the axis of the cam, this portion being indicated by the numeral 71. The cam 65 is formed upon its face opposite the face from which the sleeve 66 projects, with a short sleeve-like projection 72, and fitted onto this projection is a thin collar 73 constituting a part of a cam element which is indicated in general by the numeral 74, a washer 75 being fitted to the shaft 37 between the nut 41 and the end of the projection 72 and being recessed to engage or fit over the said projection and confine the collar 63 against the adjacent face of the cam 65. A short arm 76 projects from the collar 73 beside the face of the cam and is provided with a laterally projecting finger 77 having a rounded cam edge portion 78. The finger 77 extends across the peripheral portion 71 of the cam and the finger is rotatable independently of the cam and limited in its movement by engagement against the shoulder 69 and against the stud 70, so that in the rotation of the cam the cam element 74 will be rotated with the cam 65 when either the shoulder 69 or the stud 70 is in engagement with the finger 77, although under conditions to be presently explained, the said element 74 may remain idle during a period of rotative movement of the said cam 65.

A resilient arm 79 is secured at one end, as at 80, by the bolt 32 and at its other end supports a yoke 81, the arms 82 of which engage in a groove 83 formed circumferentially in the said collar 58. The shank of the yoke 81 has a central portion 84 and reduced portions 85 at opposite sides thereof, and the portion 84 is formed with an opening 85' which receives the sleeve extension 66 of the cam 65. This portion 84 of the yoke shank seats against the cam face of the cam 65 between the arcuate cam surfaces 67 and 68 and, when the cam is in the position shown in Figures 5 and 6 of the drawings, the reduced portion 85 of the shank engages between the relatively adjacent ends of the said cam surfaces or portions 67 and 68, and at such time the spring 61 is acting to hold the collar 58 shifted to position with the end of the pin 59 engaging in the seat 63 in the film sprocket 24. However, when the cam is rotated, under conditions of operation to be presently described, the cam portions 67 and 68 and likewise the finger 77 of the cam element 74, will coact with the yoke 81 so as to effect outward swinging of the arm 79 and the said yoke and shifting of the collar 58 to retract the pin 59 from engagement in the socket 63. Rotative movement of the cam is automatically controlled in a manner which will now be explained. The numeral 86 indicates a head which is fitted onto the end of the sleeve extension 66 of the cam 65 and adjustably held in position by a set screw 87 which is threaded into the head and adjustable to bear against the said sleeve. An arm 88 is fitted at one end into an opening 89 in the head 86 and secured in place by a set screw 90, as clearly shown in Figure 6 of the drawings. The lower end of the arm 88 is bifurcated and a disc-like wheel 91 is mounted in the bifurcation of the arm and, when the reel 12 is full, bears at its periphery against the film, as shown for example in Figure 1 of the drawings, and also in Figure 4.

The numeral 92 indicates a trip arm which is pivotally suspended at its upper end, as at 93, from an extension 94 of the cam body 65, and a coiled spring 95 is connected at its lower end, as at 96, to the said arm 92 near the lower end thereof and at its upper end is connected to the lower end of a stem 97 which has a threaded upper end portion 98 fitted through a bracket 99 mounted upon the partition wall 9, a nut 100 being threaded onto the said portion of the stem and bearing against the upper side of the bracket and being adjustable to adjust the stem longitudinally and thus vary the tension of the spring 95. At this point it will be understood that the spring 95 exerts an upward pull upon the trip arm 92, thus tending to rotate the cam 65 to the left in Figures 1, 2, 3 and 5 of the drawings. Likewise, inasmuch as the head 86 is fixed with relation to the sleeve 66 of the cam 65, the spring 95, through the medium of the arm 92, tends to rotate the sleeve 66 in a direction to swing the arm 88 toward the reel 12 so that the wheel 91 is yieldably held in engagement with the film wound upon the reel.

As previously stated, the spring 95 tends to move the trip arm 92 upwardly and through the medium of this arm, rotate the cam 65, and the movement of the arm is automatically controlled by means which coacts with the film where the film passes about the pulley 16. The said means comprises a sleeve 101 which is mounted for rocking movement upon a shaft 102 fixed at one end upon the partition wall 9, and the sleeve is provided at its end next adjacent the partition wall with a detent finger 103 extending radially from the sleeve and having a downturned end 104. The arm 92 is provided at its lower end with a laterally projecting lug 105 which engages beneath the detent finger 103 and behind the hooked or downturned end 104 thereof, as clearly shown in Figure 9 of the drawings. A boss 106 is provided at the other end of the sleeve opposite the finger 103 and the numeral 107 indicates a stem which is adjustably fitted into an opening 108 in the boss and is held in place by a set screw 109. The stem carries a rotary film engaging wheel 110 of disc-like form and the stem 107 extends downwardly in such position as to provide for coaction of the said wheel with the film in a manner to be presently described. Preferably, a curved abutment member 111 is mounted upon the inner side of the rear wall 3 of the casing, in the path of rearward movement of the wheel 110 in the rocking of the sleeve 101 upon the shaft 102, so as to limit the rearward swinging movement of the wheel and the stem by which it is carried and likewise limit the corresponding rocking movement of the sleeve 101. The numeral 112 indicates an abutment element which may be in the nature of a bolt or screw threaded into the wall 3 and which is located in the path of upward swinging movement of the detent finger 103 so as to prevent overthrowing of the device comprising the sleeve, the said finger, and the stem and wheel supported thereby, under conditions to be presently explained. The stem 107 and the wheel carried thereby are so positioned that the wheel will occupy the same vertical plane as the spacing collar 19 which, as previously stated, being of less diameter than the bodies of the pulley sections 17, provides a circumscribing groove or channel midway between the ends of the said pulley, and the periphery of the wheel is designed to engage the film at a point directly opposite this groove, being prevented normally, however, from entering the groove, due to the interposition of the film between the pulley as a whole and the said wheel.

Figure 9:
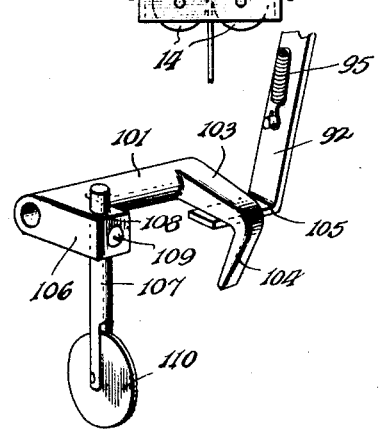
Figure 9 is a perspective view of a trip device embodied in the mechanism.

The operation of the mechanism will now be described, it being understood, of course, that the casing in which the mechanism is housed is mounted above the motion head of the motion picture projecting apparatus in connection with which the device is installed. The reel of film is arranged within the casing upon the shaft 11 and the film is led from the reel downwardly and about the pulley 16, the arm 88 having been first manually swung rearwardly to the position shown in dotted lines in Figure 1 of the drawings. When the said arm 88 is swung to the position stated, the cam 65 will be rotated so that the raised portion 68 thereof will ride behind the shank of the yoke 81, thus effecting shifting of the collar 58 upon the shaft 51 to retract the clutch pin 59 from the socket 63 in the film sprocket 24. The shaft is continuously rotated but with the parts adjusted as stated, no motion will be imparted to the film sprocket, the parts at this time assuming the position shown in Figure 7. Likewise, when the arm 88 is swung in the manner stated, the trip arm 92 will be lowered through the rotation of the cam 65 and against the tension of the spring 95, and as it lowers, the lug 105 at the lower end of the arm 92 will be moved downwardly out of engagement with the detent finger 103 and inasmuch as this finger and the boss 106 and the parts associated therewith, tend to overbalance the sleeve 101, the sleeve will be rocked so that the parts will then assume the position shown in Figure 1 of the drawings, in which position the wheel 110 is clear of the pulley 16 and in engagement with the abutment member 111. It will be observed at this point that the film-engaging wheels 91 and 110 are at this time in such position that the film reel may be readily applied to the shaft 11, as previously stated, and the film may be readily disposed about the pulley 16. The film is then led about the pulley 20 and thence upwardly between the front wall 2 of the casing and the portion 30 of the guard strip 29 and over the pulley 22. The film is then led rearwardly above the portion 34 of the guard member 29 and beneath the guide 27 and at this time the arm 42 is manually rocked rearwardly against the tension of the spring 47 so as to move the presser roller 45 out of engagement with the film sprocket 24, and the film is passed about the said film sprocket and led downwardly and between the rollers 14. The arm 42 is released as the film is placed over the film sprocket and the presser roller 45 is then held in engagement with the film to maintain the same in proper engagement with the film sprocket, through the tension of the spring 47. The arm 88 is then swung forwardly until the wheel 91 contacts the roll of film upon the reel 12 as shown in full lines in Figure 1 of the drawings. This movement of the arm does not, however, rotate the cam to a position to permit engagement of the clutch to connect the film sprocket with the shaft 51, inasmuch as the raised portion 68 of the cam is still in engagement with the yoke 81. When the arm 88 is swung in the manner stated so as to effect engagement of the wheel 91 with the film roll, the position of the detent finger 103 and the wheel 110 remains as illustrated in Figure 1. The film is now threaded through the motion head of the projecting apparatus and the apparatus is set in operation, the film being drawn from the magazine of the invention by the upper steady sprocket of the film feeding mechanism of the said motion head. This feeding of the film continues and as the diameter of the film roll decreases, the wheel will, of course, follow, and the arm 88 will gradually move forwardly. In this movement of the arm the cam 65 is gradually rotated and the arm 92 is gradually moved upwardly until the lug 105 at the lower end of the arm engages beneath the said finger 103, as shown in Figure 9. The parts are so proportioned and adjusted that at the time approximately three-fourths of the roll of film has been fed from the reel, the wheel 91 will ride past the roll of film and the arm 88 will be automatically swung to the position shown in Figure 2 of the drawings, such swinging movement being effected through the medium of the spring 95 and the arm 92 in rotating the sleeve 66 of the cam 65. As the lug 105 upon the arm 92 has at this time engaged beneath the finger 103, the upward movement of the arm 92 will effect rocking movement of the sleeve 101 so as to bring the wheel 110 into engagement with the film where it passes over the pulley 16, and the spring 95 will maintain the parts in this position so long as the film is traveling over the said pulley. However, at the moment the arm 88 is swung upwardly to the full line position shown in Figure 2, the cam 65 will be rotated to the position shown in said figure and which is likewise the position shown in Figures 5 and 6 of the drawings, and the spring 61 will at this time act to shift the collar 58 into engagement with the collar 55 and project the clutch pin 59 into the socket 63, this movement being permitted by the rotation of the cam to a position where its raised portions 67 and 68 will be out of bearing engagement against the yoke 81. Therefore, at this time, the film sprocket 24 is clutched with the shaft 51 and the sprocket is rapidly rotated so as to in a very short space of time completely unwind the remainder of the film roll from the reel 12. As shown in Figure 3 of the drawings, as the film is thus unwound, it is, of course, paid out much more rapidly than it is being taken up by the upper steady sprocket of the film feeding mechanism of the motion head and the film as unwound will be deposited in the space between the wall 6 of the casing and the partition wall 9 in the folded condition shown in Figure 3 of the drawings. At the moment the trailing end of the film passes over the pulley 16, the wheel 110 will no longer be restrained by the film and the peripheral portion of the wheel will be free to pass through the groove in the pulley, with the result that, due to the action of the spring 95, the arm 92 will be instantly moved sharply upwardly, such movement having previously been prevented through the engagement of the wheel 110 with the film. In such movement of the arm, the shoulder 69 of the cam will engage the lug 77 of the cam element 74, and this element will be rotated with the cam 65 and will ride behind the portion 85 of the yoke 81, thus effecting an immediate shifting of the collar 58 upon the shaft 51 to withdraw the clutch pin 59 from engagement in the socket 63 in the film sprocket 24, thus interrupting rotative movement of the film sprocket. As illustrated in Figure 3 of the drawings, the trailing end of the film will at this moment be deposited upon the bottom 5 of the casing, the film which has been laid within the space between the partition wall 9 and the side wall 6 of the casing, being fed from the said space, without interruption, by the upper steady sprocket of the motion head. While this portion of the film is being fed through the motion head, ample opportunity is afforded the operator of the apparatus to remove the empty reel, mount a full reel upon the shaft 11, and splice the leading end of the new film roll to the trailing end of the film which has been unwound from the first mentioned reel. Prior to mounting the full reel upon the shaft 11, the arm 88 is swung rearwardly to the position shown in dotted lines in Figure 1, so as to reset the cam 65 and the restraining device comprising the detent finger and the wheel 110. As the cam is rotated, in such swinging movement of the arm 88, the cam edge of the cam element 74 will be caused to ride behind the yoke 81, due to the engagement of the stud 70 therewith. Of course, when the arm 88 is swung as stated, the cam 65 will be rotated, so that the raised portion 68 thereof will ride behind the yoke 81, substantially at the moment the cam edge of the cam element 74 rides from behind the said yoke so that the film sprocket 24 remains idle until substantially three-fourths of the roll of new film has been unwound from the reel whereupon the previously described operations automatically take place.

From the foregoing description of the invention it will be seen that any desired number of rolls of film may be successively fed from the magazine of the invention and through the motion head of the projection apparatus without any interruption whatsoever in the projection. It will also be evident that when a new film roll is substituted for one which has been completely unwound, it is unnecessary to thread the new film through the mechanism as it is only required to splice the leading end thereof to the trailing end of the unwound film.

Having thus described the invention, what I claim is:

1. In film feeding mechanism, means for rotatably supporting a reel from which film is to be fed to the motion head of a projecting apparatus, a rotary shaft, a film sprocket rotatable upon the shaft and over which the film is normally drawn by the feed of the motion head of the said apparatus, means operable to clutch the film sprocket with the shaft, and means operatively connected with an element of the clutching means and normally coacting with the film roll and operating automatically when all but a predetermined portion of the film roll has been unwound from the reel, for actuating the clutching means to clutch the sprocket for rotation with the shaft to effect rapid unwinding of the said portion of the film roll.

2. In film feeding mechanism, means for rotatably supporting a reel from which film is to be fed to the motion head of a projecting apparatus, a rotary shaft, a film sprocket rotatable upon the shaft and over which the film is normally drawn by the feed of the motion head of the said apparatus, means operable to clutch the film sprocket with the shaft, and means operatively connected with an element of the clutching means and normally coacting with the film roll and operating automatically when all but a predetermined portion of the film roll has been unwound from the reel, for actuating the clutching means to clutch the sprocket for rotation with the shaft to effect rapid unwinding of the said portion of the film roll and, when the film has been completely unwound, to automatically unclutch the sprocket from the shaft.

3. In film feeding mechanism, means for rotatably supporting a reel from which film is to be fed to the motion head of a projecting apparatus, a rotary shaft, a film sprocket rotatable upon the shaft and over which the film is normally drawn by the feed of the motion head of the said apparatus, a clutch for clutching the film sprocket with the shaft, and means operatively connected with the clutch and coacting with the film roll and normally sustained thereby in position to hold the clutch inactive and arranged to render the clutch active, when all but a predetermined portion of the film roll has been unwound from the reel and the means is no longer sustained by the film roll, whereby to clutch the sprocket for rotation with the shaft to effect rapid unwinding of the said portion of the film roll from the reel.

4. In film feeding mechanism, means for rotatably supporting a reel from which film is to be fed to the motion head of a projecting apparatus, a rotary shaft, a film sprocket rotatable upon the shaft and over which the film is normally drawn by the feed of the motion head of the said apparatus, a clutch for clutching the film sprocket with the shaft for rotation therewith, and means for controlling the said clutch comprising an actuating arm for the clutch having an element resting in contact with the roll of film upon the reel, and means yieldably urging the said arm toward the reel, the arm being normally sustained, by the engagement of its said element with the film roll, in position to hold the clutch inactive, and, in its swinging movement, at the time the said element disengages from the film roll, when all but a predetermined portion of the film roll has been unwound from the reel, being actuated, through the medium of the urging means, to actuate the clutch to clutch the film sprocket with the shaft whereby to effect rapid unwinding of the remaining portion of the film roll.

5. In film feeding mechanism, means for rotatably supporting a reel from which film is to be fed to the motion head of a projecting apparatus, a rotary shaft, a film sprocket rotatable upon the shaft and over which the film is normally drawn by the feed of the motion head of the said apparatus, a clutch for clutching the film sprocket with the shaft for rotation therewith, means for controlling the said clutch comprising an actuating arm for the clutch having an element resting in contact with the roll of film upon the reel, means yieldably urging the said arm toward the reel, the arm in its swinging movement at the time the said element disengages from the film roll when all but a predetermined portion of the film roll has been unwound from the reel, acting to actuate the clutch to clutch the film sprocket with the shaft whereby to effect rapid unwinding of the remaining portion of the film roll, and means normally restrained from actuation by the film and rendered active upon passage of the end of the film past the same, the said means having operative connection with the clutch to effect actuation thereof to unclutch the sprocket from the shaft.

6. In film feeding mechanism, means for rotatably supporting a reel from which film is to be fed to the motion head of a projecting apparatus, a rotary shaft, a film sprocket rotatable upon the shaft and over which the film is normally drawn by the feed of the motion head of the said apparatus, a clutch for clutching the sprocket for rotation with the shaft, a rotatable cam coacting with a member of the clutch for effecting engagement and disengagement thereof, an arm fixed with relation to the cam for swinging movement, an anti-friction element carried by the arm for contact with a roll of film upon the film reel, means tending to swing the arm toward the said roll, the arm being restrained from such movement through the contact of its anti-friction element with the roll until all but a predetermined portion of the roll has been unwound from the reel whereby to permit operation of the arm through the medium of the said holding means to effect rotation of the cam and actuation of the clutch to clutch the film sprocket with the shaft and effect rapid unwinding of the film from the reel.

7. In film feeding mechanism, means for rotatably supporting a reel from which film is to be fed to the motion head of a projecting apparatus, a rotary shaft, a film sprocket rotatable upon the shaft and over which the film is normally drawn by the feed of the motion head of the said apparatus, a clutch for clutching the sprocket for rotation with the shaft, a rotatable cam coacting with a member of the clutch for effecting engagement and disengagement thereof, an arm fixed with relation to the cam for swinging movement, an anti-friction element carried by the arm for contact with a roll of film upon the film reel, means tending to swing the arm toward the said roll, the arm being restrained from such movement through the contact of its anti-friction element with the roll until all but a predetermined portion of the roll has been unwound from the reel whereby to permit operation of the arm through the medium of the said holding means to effect rotation of the cam and actuation of the clutch to clutch the film sprocket with the shaft and effect rapid unwinding of the film from the reel, and means for limiting the movement of the arm after its actuation to actuate the clutch, the said means being maintained in active position by the stretch of film passing from the reel and rendered inactive when the end of the film has passed from the reel, and thereby permit of further movement of said arm to effect rotation of the cam to render the clutch inactive.

8. In film feeding mechanism, means for rotatably supporting a reel from which film is to be fed to the motion head of a projecting apparatus, a rotary shaft, a film sprocket rotatable upon the shaft and over which the film is normally drawn by the feed of the motion head of the said apparatus, a clutch member rotatable with the shaft and shiftable into and out of coactive engagement with the sprocket, a rotatable cam, means actuated through rotative adjustment of the cam for shifting the clutch member, a trip member connected with the cam, a spring coacting with said member and urging the same in a direction to rotate the cam to position to render the clutch active, an arm operatively connected with the cam for movement therewith, an element carried by the arm for contact with the roll of film upon the reel to restrain the arm from movement under the influence of the spring and thus maintain the cam in inactive position, the distance between the axis of movement of the arm and the support for the reel being greater than the distance between said axis and the film contacting element whereby to provide for disengagement of the film contacting element from the film roll when the diameter of the film roll has been predeterminately reduced, through unwinding of the film, and whereby the movement of the arm, when released, will effect movement of the cam to render the clutch active to clutch the film sprocket with its shaft.

9. In film feeding mechanism, means for rotatably supporting a reel from which film is to be fed to the motion head of a projecting apparatus, a rotary shaft, a film sprocket rotatable upon the shaft and over which the film is normally drawn by the feed of the motion head of the said apparatus, a clutch member rotatable with the shaft and shiftable into and out of coactive engagement with the sprocket, a rotatable cam, means actuated through rotative adjustment of the cam for shifting the clutch member, a trip member connected with the cam, a spring coacting with said member and urging the same in a direction to rotate the cam to position to render the clutch active, an arm operatively connected with the cam for movement therewith, an element carried by the arm for contact with the roll of film upon the reel to restrain the arm from movement under the influence of the spring and thus maintain the cam in inactive position, the distance between the axis of movement of the arm and the support for the reel being greater than the distance between said axis and the film contacting element whereby to provide for disengagement of the film contacting element from the film roll when the diameter of the film roll has been predeterminately reduced, through unwinding of the film, and whereby movement of the arm, when released, will effect movement of the cam to render the clutch active to clutch the film sprocket with its shaft, and means normally restrained through contact with a stretch of the film and coacting with the trip member to in turn restrain the same from actuation whereby when the last mentioned means is relieved of restraint at the time the end of the film has left the reel and passed said means, the trip member will be tripped to effect rotative adjustment of the cam to render the clutch inactive.

10. In film feeding mechanism, means for rotatably supporting a reel from which film is to be fed to the motion head of a projecting apparatus, a rotary shaft, a film sprocket rotatable upon the shaft and over which the film is normally drawn by the feed of the motion head of the said apparatus, a clutch member rotatable with the shaft and shiftable into and out of coactive engagement with the sprocket, a rotatable cam, means actuated through rotative adjustment of the cam for shifting the clutch member, a trip member connected with the cam, a spring coacting with said member and urging the same in a direction to rotate the cam to position to render the clutch active, an arm operatively connected with the cam for movement therewith, an element carried by the arm for contact with the roll of film upon the reel to restrain the arm from movement under the influence of the spring and thus maintain the cam in inactive position, the distance between the axis of movement of the arm and the support for the reel being greater than the distance between said axis of the film contacting element whereby to provide for disengagement of the film contacting element from the film roll when the diameter of the film roll has been predeterminately reduced, through unwinding of the film, and whereby movement of the arm, when released, will effect movement of the cam to render the clutch active to clutch the film sprocket with its shaft, and means normally restrained through contact with a stretch of the film and coacting with the trip member to in turn restrain the same from actuation whereby when the last mentioned means is relieved of restraint at the time the end of the film has left the reel and passed said means, the trip member will be tripped to effect rotative adjustment of the cam to render the clutch inactive, the last mentioned means comprising a rocking arm, a film contacting wheel carried thereby, an idle film pulley about which the said stretch of the film is passed, the said pulley having a peripheral groove and the said wheel being positioned to contact the film opposite the groove whereby to be normally restrained by the film and, after the film end has passed over the pulley, permitting the wheel to pass through the groove and thus permit operative movement of the arm, and a detent finger associated with the said arm and movable therewith, and means upon the trip member engaging the said detent finger and restraining the trip member from movement to active position under the influence of the said spring when the said film engaging wheel is in engagement with the film.

11. In film feeding mechanism, a casing, a partition wall within the casing dividing the same to provide a compartment housing the mechanism and a film receiving compartment, means within the first mentioned compartment for supporting a reel from which film is to be fed to the motion head of a projecting apparatus, a film guide pulley, in the first mentioned compartment about which the film is to be led from the reel, a film guide pulley and a film sprocket in the second mentioned compartment about which the film is to be led from the first mentioned pulley, whereby the film may be led from the second mentioned compartment through a wall of the casing to the feed of the motion head of the projecting apparatus and drawn thereby from the mechanism, a shaft supporting the film sprocket for rotation, means for imparting continuous rotary motion to the shaft, and means operating automatically when all but a predetermined portion of the film roll has been unwound from the reel, for clutching the sprocket for rotation with the shaft to effect rapid unwinding of the said portion of the film roll and disposition of the unwound film in the said film receiving compartment.

12. In film feeding mechanism, a casing, a partition wall within the casing dividing the same to provide a compartment for housing the mechanism and a film receiving compartment, means within the first mentioned compartment for supporting a reel from which film is to be fed to the motion head of a projecting apparatus, a film guide pulley in the first mentioned compartment about which the film is to be led from the reel, a film guide pulley and a film sprocket in the second mentioned compartment about which the film is to be fed from the first mentioned pulley, whereby the film may be led from the second mentioned compartment through a wall of the casing to the feed of the motion head of the projecting apparatus and drawn thereby from the mechanism, a shaft supporting the film sprocket for rotation, means for imparting continuous rotary motion to the shaft, and means operating automatically when all but a predetermined portion of the film roll has been unwound from the reel, for clutching the sprocket for rotation with the shaft to effect rapid unwinding of the said portion of the film roll and disposition of the unwound film in the said film receiving compartment, and, when the film has been completely unwound from the reel, for automatically unclutching the sprocket from the shaft whereby to discontinue the feeding of the film by the sprocket and whereby to deposit the trailing end of the film into the first mentioned compartment where it may be spliced to the end of a film upon a replacement reel substituted for the empty reel.

13. In film feeding mechanism, a casing, a partition wall within the casing dividing the same to provide a compartment for housing the mechanism and a film receiving compartment, means within the first mentioned compartment for supporting a reel from which film is to be fed to the motion head of a projecting apparatus, a film guide pulley in the first mentioned compartment about which the film is to be led from the reel, a film guide pulley and a film sprocket in the second mentioned compartment about which the film is to be led from the first mentioned pulley, whereby the film may be led from the second mentioned compartment through a wall of the casing to the feed of the motion head of the projecting apparatus and drawn thereby from the mechanism, a shaft supporting the film sprocket for rotation, means for imparting continuous rotary motion to the shaft, means operating automatically when all but a predetermined portion of the film roll has been unwound from the reel for clutching the sprocket for rotation with the shaft to effect rapid unwinding of the said portion of the film roll and the disposition thereof in the said film receiving compartment, a presser roll coacting with the said film sprocket, means yieldably holding the presser roll in coactive relation to the said sprocket, and a guard within the second mentioned compartment extending from a wall thereof to a point adjacent the said presser roll whereby to insure of delivery of the said portion of the film into the said film receiving compartment.

In testimony whereof we affix our signatures.

EARL L. DELANO. [L. S.]
GEORGE L. FURLONG. [L. S.]